UNITED STATES PATENT OFFICE.

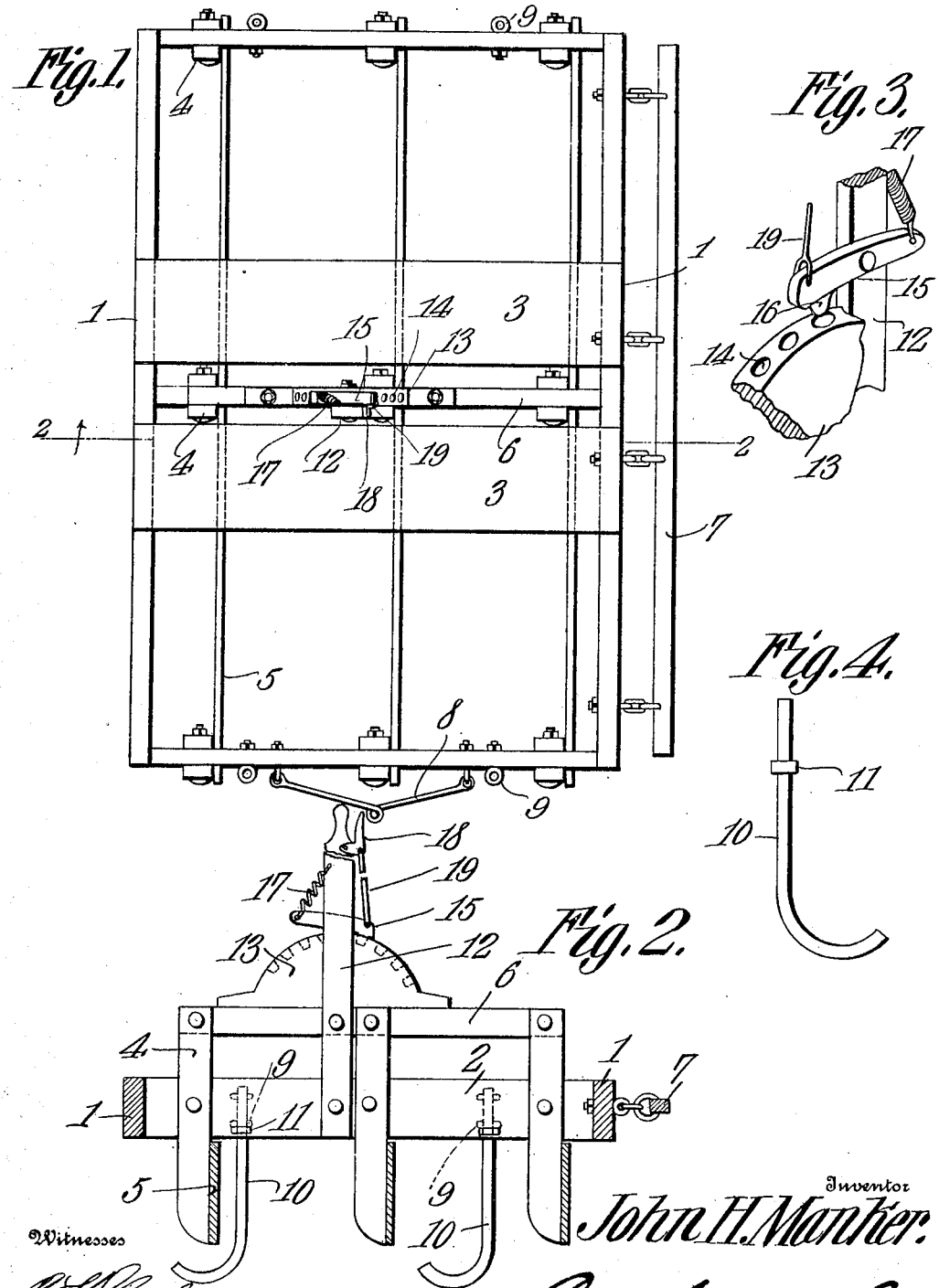

JOHN H. MANKER, OF NEW VIENNA, OHIO.

DRAG.

No. 916,745.  Specification of Letters Patent.  Patented March 30, 1909.

Application filed July 24, 1908. Serial No. 445,237.

*To all whom it may concern:*

Be it known that I, JOHN H. MANKER, a citizen of the United States, residing at New Vienna, in the county of Clinton and State of Ohio, have invented a new and useful Drag, of which the following is a specification.

This invention has relation to drags adapted to be used for leveling and pulverizing soil and it consists in the novel construction and arrangements of its parts, as hereinafter shown and described.

The object of the invention is to provide a drag of simple construction which is adapted to be easily manipulated for the purposes stated, and which is provided with a series of adjustable blades and lever mechanism for adjusting the said blades with relation to the surface of the soil.

The drag consists primarily of a frame which is made up of longitudinally disposed sills and transversely disposed beams which connect the said sills together. Standards are pivotally connected with the said beams and are arranged in rows transversely across the implement. Drag or scraper blades are connected with the said standards and a lever mechanism is fulcrumed upon one of the beams and is operatively connected with a bar which pivotally connects the upper end portions of the intermediate standards together. The side standards are also pivotally connected together by bars, and the side-beams are provided with eyes which are adapted to retain the shanks of runners, whereby the blades may be elevated entirely above the surface of the ground, and the implement may be drawn from place to place upon the said runners. A draft bar is located at the side of one of the sills, and a draft means is attached with one of the side beams, and by such an arrangement the implement may be drawn in front of a gate and then the draft animal or animals may be hitched to the draft means attached to the side beam and the implement may be readily passed through a narrow gateway.

Figure 1 is a top plan view of the drag. Fig. 2 is a sectional view of the same cut on line "2—2" of Fig. 1. Fig. 3 is a perspective view of a pawl used upon the drag, and Fig. 4 is a side view of a runner adapted to be used in connection with the drag.

The drag consists of a frame which is made up of the transversely disposed sills 1, and the longitudinally disposed beams 2. The said sills 1, are connected to the end of the beams. The boards or plates 3, are located upon the upper side of the said frame. The standards 4, are arranged in pairs, the members of the said pairs are pivotally connected with the opposite side of the beam 2. The said standards are arranged in alinement transversely across the implement, and are also in alinement along the beams 2. The blades 5, extend transversely across the implement and are connected with the lower portions of the alined standards 4. The bars 6, are pivotally connected with the upper end portions of the standards 4, and lie in planes vertically above the beams 2. The draft-bar 7, is connected with the forward sill 1, and the draft member 8, is connected with one of the side beams 2. The eyes 9, are arranged in pairs, and are located upon the outer side of the side beams 2. The said eyes are adapted to receive the shanks of the runners 2. The shanks of the said runners are provided with the shoulders 11, which are adapted to bear against the lower eyes 9, and limits the vertical movement of the runners within the said eyes. The lever 12, is fulcrumed to the intermediate beam 2, and is pivotally connected with the bar 6, located vertically above the said intermediate beam 2. The segment 13, is mounted upon the bar 6, which is located above the intermediate beam 2, and the said segment is provided in its upper edge with the indentation 14. The pawl 15, is pivotally mounted upon the lever 12, and is provided with a depending lug, 16, which is adapted to enter successively the indentations 14. One end of the coil spring 17, is connected with that end of the pawl 15, opposite to the end thereof carrying the lug 16, and the other end of the said spring 17, is connected with the lever 12. The said spring 17 is under tension with a tendency to move the lug 16, against the upper edge of the segment 13. The handle grip 18, is pivotally mounted upon the lever 12, and the rod 19, connects the said grip 18, with the pawl 15, at the end portion thereof, opposite to that to which the spring 17, is connected.

The operation of the drag is as follows:— It is obvious that by swinging the lever 12, that the intermediate bar 6 will be moved longitudinally with relation to the beam 2, lying under the same, and as this occurs the standards 9 will be swung upon their pivotal connection with the beams 2. This movement will be uniform and regular throughout the entire set of standards, and consequently the blades 5, carried by the said standards may be pitched at a desired angle with relation to the surface of the soil. When the said blades are properly positioned, the lug 16, carried by the pawl 15, is permitted to enter one of the indentations 14, upon the segment 13, and thus the said blades will be held in the said position. When the implement is performing its functions as a drag or scraper the draft animals are connected with the draft bar 7. When however it is desired to transport the implement from place to place with the lower edges of the blades 5, elevated entirely above the surface of the ground, the shank portions of the runners 10, are inserted in the eyes 9, and thus the body portion of the implement is held in an elevated position and may be transported as indicated.

If during the transportation of the implement as above described, when the same is being drawn and supported by the runner 10, and it is desired to pass the implement through a comparatively narrow gateway; the implement is drawn in front of the gateway so that the sills 1, are virtually in alinement with the passageway through the gate. Then the draft animals are transferred from the draft-bar 7, to the draft member 8, and the implement may be readily drawn through the gateway and abruptly changed at an angle in its course of movement. That is to say it approaches the gateway in one line, and passes through the gateway at an abrupt angle to the said line of approach.

Having described my invention, what I claim as new, and desire to secure by Letters Patent, is—

A drag comprising a frame composed of sills and beams connected together, standards arranged in pairs and being pivotally connected with the opposite sides of the beams, blades located transversely under the frame of the implement and being connected with the alined lower end portions of the said standards, bars pivotally connecting the upper end portions of the said standards together, and lying vertically above the beams, a lever fulcrumed to one of the beams, and being pivotally connected with that bar located above the said beam to which it is pivotally connected, a segment mounted upon the said bar, concentric with the upper pivot of the lever and having indentations, a pivoted pawl carried by the lever, said pawl being provided with a lug adapted to enter the indentation of said segment and a spring connected at one end with the pawl and at its opposite end with the said lever and means for lifting the pawl against the tension of the said spring.

In testimony that I claim the foregoing as my own, I have hereto affixed my signature in the presence of two witnesses.

JOHN H. MANKER.

Witnesses:
 ED. MONTGOMERY,
 G. W. COLLINS.